(12) United States Patent
Suzuki

(10) Patent No.: US 12,086,482 B2
(45) Date of Patent: Sep. 10, 2024

(54) OVERPRINTING INSPECTION APPARATUS AND NON-TRANSITORY COMPUTER READABLE MEDIUM STORING OVERPRINTING INSPECTION PROGRAM

(71) Applicant: FUJIFILM Business Innovation Corp., Tokyo (JP)

(72) Inventor: Kodai Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 560 days.

(21) Appl. No.: 17/159,104

(22) Filed: Jan. 26, 2021

(65) Prior Publication Data

US 2022/0075576 A1 Mar. 10, 2022

(30) Foreign Application Priority Data

Sep. 9, 2020 (JP) ................................ 2020-151120

(51) Int. Cl.
*G06F 3/12* (2006.01)
*G06K 15/02* (2006.01)
*H04N 1/00* (2006.01)

(52) U.S. Cl.
CPC ............ *G06F 3/1234* (2013.01); *G06F 3/121* (2013.01); *H04N 1/00005* (2013.01); *H04N 1/00015* (2013.01); *H04N 1/00023* (2013.01)

(58) Field of Classification Search
None
See application file for complete search history.

(56) References Cited

U.S. PATENT DOCUMENTS

| 8,718,332 | B2 | 5/2014 | Yasuda et al. | |
| 2002/0196464 | A1* | 12/2002 | Kodama | G06K 15/007 358/1.15 |
| 2010/0025472 | A1* | 2/2010 | Morgana | G06K 7/10851 235/462.04 |
| 2011/0075890 | A1* | 3/2011 | Yasuda | G06T 7/001 382/112 |
| 2019/0196379 | A1* | 6/2019 | Sugata | G03G 15/5058 |
| 2019/0212955 | A1* | 7/2019 | Gutierrez | G06K 15/1822 |
| 2021/0241053 | A1* | 8/2021 | Takahashi | B41J 2/01 |

FOREIGN PATENT DOCUMENTS

| JP | 2000210624 | | 8/2000 | |
| JP | 2002166616 | * | 6/2002 | .............. G06F 3/12 |
| JP | 2007171287 | * | 7/2007 | .............. B41J 21/16 |
| JP | 2010128759 | | 6/2010 | |
| JP | 2011070548 | * | 4/2011 | .......... H04N 1/0005 |
| JP | 2018079581 | * | 5/2018 | ................ B41J 5/00 |
| JP | 2018134847 | | 8/2018 | |

OTHER PUBLICATIONS

"Office Action of Japan Counterpart Application", issued on Jun. 18, 2024, with English translation thereof, p. 1-p. 8.

* cited by examiner

*Primary Examiner* — Beniyam Menberu
(74) *Attorney, Agent, or Firm* — JCIPRNET

(57) ABSTRACT

An overprinting inspection apparatus includes a processor configured to detect failure in overprinting by comparing succeeding print data and a succeeding image detected from a post-overprinting medium obtained by the overprinting. The overprinting is printing of the succeeding image based on the succeeding print data over a pre-overprinting medium on which a preceding image has been printed based on preceding print data.

20 Claims, 11 Drawing Sheets

OVERPRINTING INSPECTION APPARATUS AND NON-TRANSITORY COMPUTER READABLE MEDIUM STORING OVERPRINTING INSPECTION PROGRAM

CROSS-REFERENCE TO RELATED APPLICATIONS

This application is based on and claims priority under 35 USC 119 from Japanese Patent Application No. 2020-151120 filed Sep. 9, 2020.

BACKGROUND

(i) Technical Field

The present disclosure relates to an overprinting inspection apparatus and a non-transitory computer readable medium storing an overprinting inspection program.

(ii) Related Art

There is known a process for printing an image on a print medium on which another image has already been printed. This printing process is called "overprinting". A print medium on which an image has been printed but another image has not been overprinted is herein called "pre-overprinting medium". An image printed on the pre-overprinting medium is herein called "preceding image". A print medium that has undergone the overprinting is herein called "post-overprinting medium". An image printed on the post-overprinting medium is herein called "post-overprinting image". A post-overprinting image obtained by proper overprinting is a combination of a preceding image and a succeeding image.

There is known a process of detecting printing failure after print data is printed on a print medium by comparing the print data and an image obtained by optically reading the print medium having undergone the printing (i.e., an image printed on the print medium). For example, determination may be made that no printing failure occurs if the print data and the read image have a match at a level equal to or higher than a predetermined threshold, and that a printing failure has occurred if the print data and the read image have a match at a level lower than the threshold. Examples of the printing failure include a trouble in a process for rasterizing print data (data corruption), and a trouble in a process for printing print data on a print medium (e.g., fading or soiling).

As illustrated in FIG. 12, a preceding image forming apparatus prints a preceding image based on preceding print data, a succeeding image forming apparatus overprints a succeeding image on a pre-overprinting medium based on succeeding print data, and an overprinting inspection apparatus detects failure in the overprinting.

In the overprinting performed by the succeeding image forming apparatus, the succeeding print data indicates the succeeding image ("batter" image in the example of FIG. 12), but the preceding image (numeral "1" in the example of FIG. 12) as well as the succeeding image is printed on the post-overprinting medium. That is, the succeeding print data differs from the post-overprinting image even though the overprinting is performed properly.

Thus, the overprinting inspection apparatus is unable to appropriately detect the overprinting failure by merely comparing the succeeding print data with the post-overprinting image.

In view of the above, Japanese Unexamined Patent Application Publication No. 2011-70548 discloses an image inspection apparatus that detects overprinting failure by generating an inspection target image in which a preprinted element on preprinted paper serving as a pre-overprinting medium is reduced based on a preprinted image obtained by shooting the preprinted paper and a post-overprinting image obtained by shooting a post-overprinting medium, and comparing the generated inspection target image and additional recording data serving as succeeding print data.

SUMMARY

Aspects of non-limiting embodiments of the present disclosure relate to the following circumstances. Taking the method of Japanese Unexamined Patent Application Publication No. 2011-70548 as an example, overprinting failure may be detected by comparing print data and an image printed on a print medium. In this case, the comparison may be made by using three pieces of data, that is, preceding print data, succeeding print data, and a post-overprinting image. For example, the post-overprinting image may be compared with combined data obtained by combining the preceding print data and the succeeding print data. Alternatively, the succeeding print data may be compared with image data obtained by subtracting the preceding print data from the post-overprinting image. Still alternatively, the preceding print data may be compared with image data obtained by subtracting the succeeding print data from the post-overprinting image.

The comparison among the preceding print data, the succeeding print data, and the post-overprinting image may require a larger comparison target data amount than comparison between a succeeding image and the succeeding print data. The increase in the comparison target data amount may cause, for example, an increase in a processing amount for the comparison.

When the print data and the image printed on the print medium are compared to detect failure in the overprinting that involves printing the succeeding image based on the succeeding print data over the print medium on which the preceding image has been printed based on the preceding print data, it is appropriate to reduce the comparison target data amount in contrast with the comparison among the preceding print data, the succeeding print data, and the image printed on the post-overprinting medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an overprinting inspection apparatus comprising a processor configured to detect failure in overprinting by comparing succeeding print data and a succeeding image detected from a post-overprinting medium obtained by the overprinting. The overprinting is printing of the succeeding image based on the succeeding print data over a pre-overprinting medium on which a preceding image has been printed based on preceding print data.

BRIEF DESCRIPTION OF THE DRAWINGS

An exemplary embodiment of the present disclosure will be described in detail based on the following figures, wherein.

DETAILED DESCRIPTION

Figure 1:
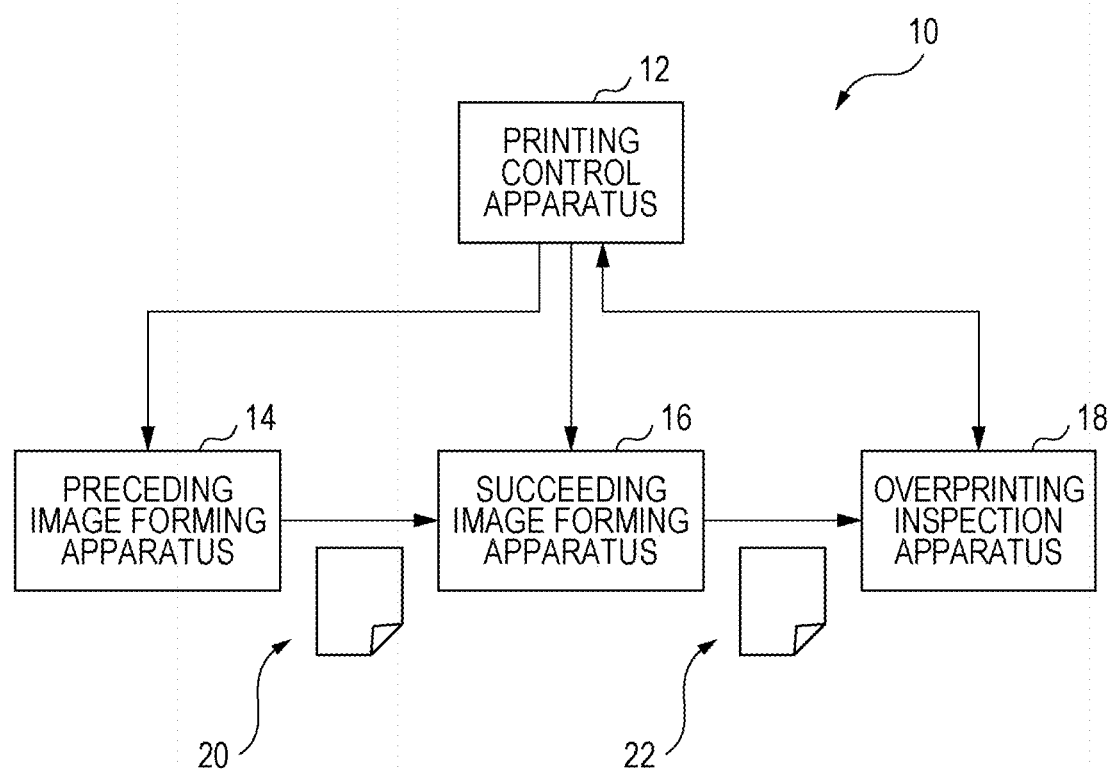
FIG. 1 is a schematic diagram illustrating the configuration of an overprinting system according to an exemplary embodiment.

FIG. 1 is a schematic diagram illustrating the configuration of an overprinting system 10 according to an exemplary embodiment. The overprinting system 10 performs overprinting and detects failure in the overprinting. For example, the overprinting system 10 is installed in, but not limited to, a production printing company. As illustrated in FIG. 1, the overprinting system 10 includes a printing control apparatus 12, a preceding image forming apparatus 14, a succeeding image forming apparatus 16, and an overprinting inspection apparatus 18. The printing control apparatus 12 is communicably connected to the preceding image forming apparatus 14, the succeeding image forming apparatus 16, and the overprinting inspection apparatus 18.

The printing control apparatus 12 controls the preceding image forming apparatus 14, the succeeding image forming apparatus 16, and the overprinting inspection apparatus 18. In other words, the printing control apparatus 12 controls the overprinting and the detection of overprinting failure. Further, the printing control apparatus 12 serves as an interface for a person who uses the overprinting system 10 (i.e., user). Details of the printing control apparatus 12 are described later with reference to, for example, FIG. 2.

The preceding image forming apparatus 14 and the succeeding image forming apparatus 16 are printers. Specifically, each of the preceding image forming apparatus 14 and the succeeding image forming apparatus 16 includes a receiver that receives a print request (i.e., print job) from the printing control apparatus 12, a transporter that transports a print medium such as paper, a converter that converts non-rasterized print data in the print job into rasterized print data (data in a format recognizable by a printing component described later), and a printing component that prints an image on the print medium based on the print data.

Description is given about a flow of overprinting to be performed in the overprinting system 10. First, the printing control apparatus 12 transmits a preceding print job containing preceding print data indicating a preceding image to the preceding image forming apparatus 14, and transmits a succeeding print job containing succeeding print data indicating a succeeding image to the succeeding image forming apparatus 16. The preceding image forming apparatus 14 prints the preceding image on a print medium based on the preceding print job. The print medium on which the preceding image has been printed is a pre-overprinting medium 20. The pre-overprinting medium 20 is transported to the succeeding image forming apparatus 16 by the user or the transporter of the preceding image forming apparatus 14. Subsequently, the succeeding image forming apparatus 16 prints the succeeding image on the pre-overprinting medium 20 based on the succeeding print job. That is, the succeeding image forming apparatus 16 performs overprinting. The print medium on which the preceding image and the succeeding image have been printed is a post-overprinting medium 22. The post-overprinting medium 22 is transported to the overprinting inspection apparatus 18 by the user or the transporter of the succeeding image forming apparatus 16.

The overprinting inspection apparatus 18 detects failure in the overprinting performed by the succeeding image forming apparatus 16. Description is given later about the structure of the overprinting inspection apparatus 18 and details of the failure detection to be performed by the overprinting inspection apparatus 18. Prior to the overprinting failure detection, the overprinting inspection apparatus 18 may detect failure in the printing performed by the preceding image forming apparatus 14. Specifically, the overprinting inspection apparatus 18 may detect failure in the printing performed by the preceding image forming apparatus 14 by comparing the preceding print data and the preceding image obtained by optically reading the pre-overprinting medium 20 (e.g., image scanning by a scanner or image shooting by a camera).

Figure 2:
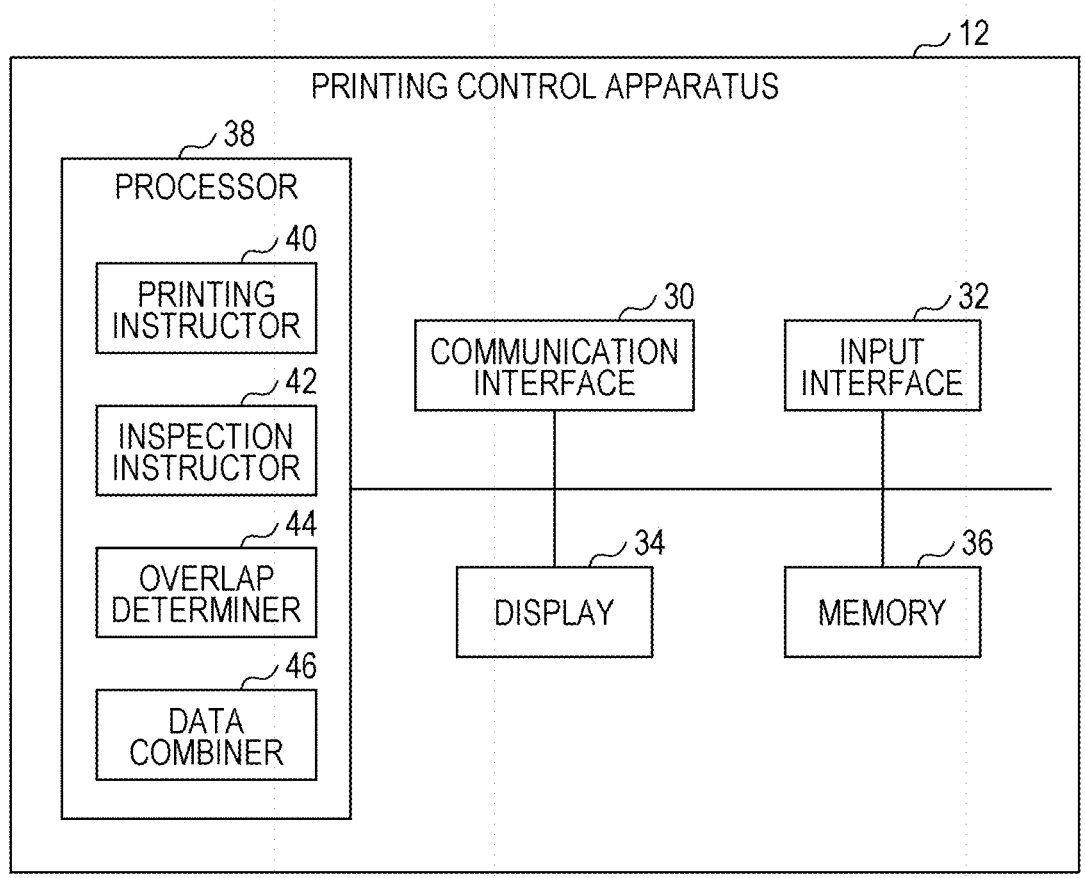
FIG. 2 is a schematic diagram illustrating the configuration of a printing control apparatus according to the exemplary embodiment.

FIG. 2 is a schematic diagram illustrating the configuration of the printing control apparatus 12. The printing control apparatus 12 may be any apparatus as long as the following functions are implemented. Examples of the printing control apparatus 12 include a computer provided beside the preceding image forming apparatus 14, the succeeding image forming apparatus 16, and the overprinting inspection apparatus 18. Examples of the printing control apparatus 12 also include a server computer communicable with the preceding image forming apparatus 14, the succeeding image forming apparatus 16, the overprinting inspection apparatus 18, and a user terminal of the user.

Examples of a communication interface 30 include a network adapter and a dedicated adapter that connects the printing control apparatus 12 to other apparatuses (preceding image forming apparatus 14, succeeding image forming apparatus 16, and overprinting inspection apparatus 18). The communication interface 30 has a function of communicating with other apparatuses. For example, the communication interface 30 receives a print job from the user terminal of the user of the overprinting system 10. The communication interface 30 transmits print data to each of the preceding image forming apparatus 14 and the succeeding image forming apparatus 16. The communication interface 30 transmits inspection instruction information related to overprinting inspection to the overprinting inspection apparatus 18 (details are described later). The communication interface 30 receives a result of overprinting inspection from the overprinting inspection apparatus 18.

Examples of an input interface 32 include buttons and a touch panel. The input interface 32 is used for inputting an instruction from the user of the overprinting system 10 to the printing control apparatus 12.

Examples of a display 34 include a liquid crystal display. The display 34 displays various types of information related to the overprinting system 10. For example, the display 34 displays a result of overprinting inspection performed by the overprinting inspection apparatus 18.

Examples of a memory 36 include a hard disk drive (HDD), a solid state drive (SSD), a read only memory (ROM), and a random access memory (RAM). The memory 36 may be provided separately from a processor 38 described later, or at least a part of the memory 36 may be provided inside the processor 38. The memory 36 stores a printing control program for operating individual parts of the printing control apparatus 12. The memory 36 temporarily retains a print job input by the user.

In this exemplary embodiment, the print job contains print data indicating an image to be printed. As described above, the data format of the print data in the print job transmitted by the printing control apparatus 12 is a non-raster format unrecognizable by the preceding image forming apparatus 14 and the succeeding image forming apparatus 16. The print data is rasterized by the preceding image forming apparatus 14 or the succeeding image forming apparatus 16 and an image corresponding to the print data is printed on a print medium. Examples of the print job include a preceding print job for the preceding image forming apparatus 14, and a succeeding print job for the succeeding image forming apparatus 16. The preceding print job contains preceding print data indicating a preceding image. The succeeding print job contains succeeding print data indicating a succeeding image. Examples of contents of the preceding print data include, but not limited to, a frame and a ruled line. Examples of contents of the succeeding print data include, but not limited to, a text and a numeral placed in the frame or along the ruled line. The contents of the preceding print data may be images having a first color and the contents of the succeeding print data may be images having a second color different from the first color. That is, the preceding image and the succeeding image may be printed in different colors. The preceding print data and the succeeding print data are collectively called "print data" herein unless otherwise distinguished.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As illustrated in FIG. 2, the processor 38 functions as a printing instructor 40, an inspection instructor 42, an overlap determiner 44, and a data combiner 46 based on the printing control program stored in the memory 36.

The printing instructor 40 transmits print jobs containing print data to the preceding image forming apparatus 14 and the succeeding image forming apparatus 16. Specifically, the printing instructor 40 transmits a preceding print job containing preceding print data indicating a preceding image to the preceding image forming apparatus 14, and transmits a succeeding print job containing succeeding print data indicating a succeeding image to the succeeding image forming apparatus 16.

Figure 3A:
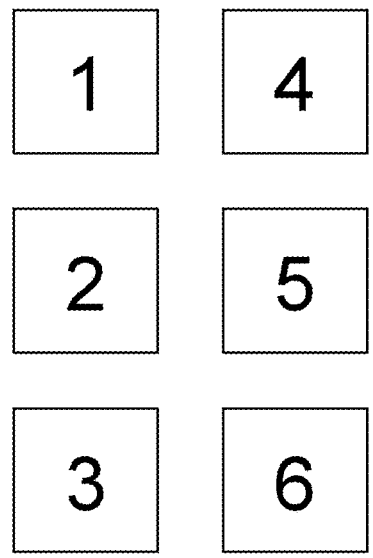
FIG. 3A illustrates an example of preceding print data.

FIG. 3A illustrates an example of the preceding print data. In the example of FIG. 3A, the preceding print job is an instruction to print six pages of a print medium, and the preceding print data indicates preceding images on the six pages. In the example of FIG. 3A, the preceding print data includes characters "1" to "6" to be printed on the first to sixth pages, respectively. The preceding print data need not indicate the preceding images on the plurality of pages but may indicate a preceding image on a single page.

Figure 3B:
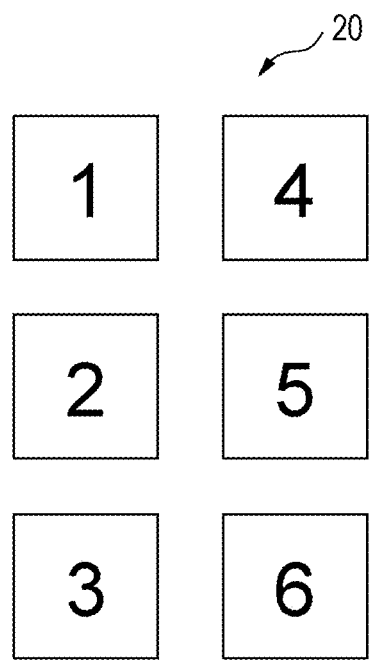
FIG. 3B illustrates an example of a pre-overprinting medium.

FIG. 3B illustrates the pre-overprinting medium 20 on which the preceding images have been printed by the preceding image forming apparatus 14 based on the preceding print job containing the preceding print data illustrated in FIG. 3A. In this example, the preceding print data indicates the preceding images on the six pages. Therefore, the pre-overprinting medium 20 has six pages and characters "1" to "6" are printed on the first to sixth pages as the preceding images, respectively. If the preceding print data indicates a preceding image on a single page, the pre-overprinting medium 20 has a single page as well.

In this example, each preceding image is printed in black. Specifically, a monochrome mode may be selected as a print mode setting in the preceding print job, or the color of the preceding image indicated by the preceding print data may be black.

Comparing FIG. 3A and FIG. 3B, when the preceding image forming apparatus 14 properly performs printing based on the preceding print job, the contents of the preceding print data (images indicated by the preceding print data) have a match with the preceding images printed on the pre-overprinting medium 20.

Figure 4A:
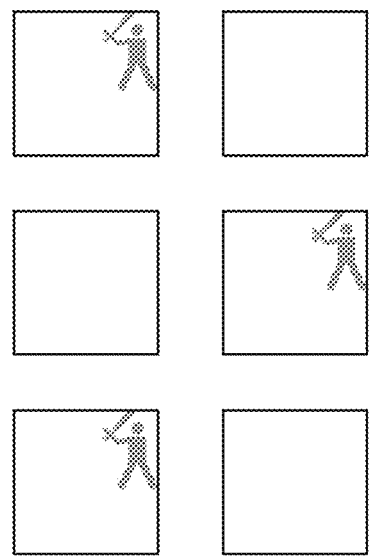
FIG. 4A illustrates an example of succeeding print data.

FIG. 4A illustrates an example of the succeeding print data. In this example, the preceding print job is the instruction to print the six pages as described above, and therefore the succeeding print job is also an instruction to print six pages. Thus, the succeeding print data indicates succeeding images on the six pages. If the preceding print job is an instruction to print a single page, the succeeding print job may also be an instruction to print a single page.

In the example of FIG. 4A, the succeeding print data includes "batter" images to be printed at upper right corners of the first, third, and fifth pages. The second, fourth, and sixth pages have no image. That is, in the example of FIG. 4A, the succeeding print data indicates that the "batter" images are printed only on the first, third, and fifth pages, and no image is printed on the second, fourth, and sixth pages.

Figure 4B:
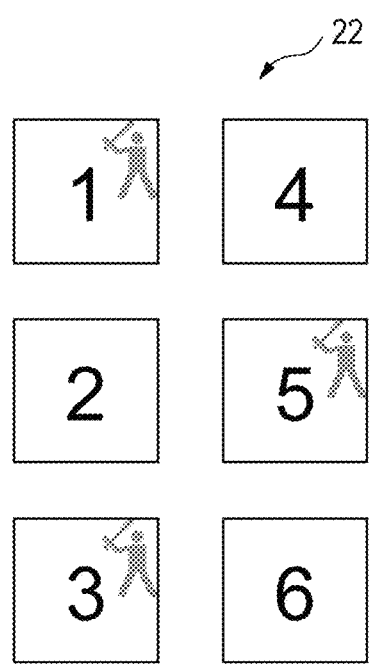
FIG. 4B illustrates an example of a post-overprinting medium.

FIG. 4B illustrates the post-overprinting medium 22 obtained by the succeeding image forming apparatus 16 overprinting the succeeding images on the pre-overprinting medium 20 illustrated in FIG. 3B based on the succeeding print job containing the succeeding print data illustrated in FIG. 4A. On the post-overprinting medium 22 illustrated in FIG. 4B, the characters "1", "3", and "5" serving as the preceding images and the "batter" images serving as the succeeding images are printed as post-overprinting images on the first, third, and fifth pages, respectively. Only the characters "2", "4", and "6" serving as the preceding images are printed as post-overprinting images on the second, fourth, and sixth pages, respectively.

In this exemplary embodiment, each succeeding image is overprinted in a color that is not used for the preceding image (called "specific color" herein). Specifically, a color-print mode is selected as a print mode setting in the succeeding print job, and the color of the succeeding image indicated by the succeeding print data is the specific color. In this example, the preceding image is printed in black as described above, and therefore the succeeding image is printed in a color other than black. For example, the succeeding image is printed in red. The specific color may be a plurality of colors. For example, if the preceding image is printed in black, the succeeding image may be printed in a plurality of specific colors other than black (e.g., red, blue, and yellow).

If the preceding image is printed by using a plurality of colors, the succeeding image is printed in a specific color other than the plurality of colors used for the preceding image. For example, if the preceding image is printed in two colors that are black and red, the succeeding image is printed in blue as the specific color. If the post-overprinting medium 22 has a plurality of pages as in this example, the succeeding images on the respective pages need not be printed in the same specific color. For example, if the preceding image is printed in black, the succeeding image on the first page may be printed in red, the succeeding image on the third page may be printed in blue, and the succeeding image on the fifth page may be printed in yellow. Also in this case, a plurality of specific colors may be used for the succeeding image on each page.

Comparing FIG. 4A and FIG. 4B, even though the succeeding image forming apparatus 16 properly performs printing based on the succeeding print job, the contents of the succeeding print data (images indicated by the succeeding print data) do not have a match with the post-overprinting images on the post-overprinting medium 22 on which the preceding images and the succeeding images have been printed (first, third, and fifth pages in FIG. 4B).

Referring back to FIG. 2, the inspection instructor 42 causes the overprinting inspection apparatus 18 to inspect overprinting by transmitting, to the overprinting inspection apparatus 18, inspection information necessary to inspect the overprinting and an instruction to inspect the overprinting.

In this exemplary embodiment, the inspection information to be transmitted to the overprinting inspection apparatus 18 by the inspection instructor 42 may be specific-color information indicating a specific color used for printing the succeeding image. The inspection instructor 42 may identify the specific color by analyzing the succeeding print data. If the user has input the specific color via the input interface 32, the inspection instructor 42 may identify the specific color based on the user's input.

If the succeeding image is printed in a plurality of colors, the specific-color information indicates a plurality of specific colors. If the post-overprinting medium 22 has a plurality of pages and the succeeding images on the respective pages are printed in different specific colors, the inspection instructor 42 transmits, to the overprinting inspection apparatus 18, specific-color information in which page numbers of the post-overprinting medium 22 are associated with the specific colors used for printing the succeeding images on the respective pages.

The inspection information to be transmitted to the overprinting inspection apparatus 18 by the inspection instructor 42 may be specific-area information indicating a specific area where the succeeding image is printed on the post-overprinting medium 22, in place of or in addition to the specific-color information. The inspection instructor 42 may identify the specific area by analyzing the succeeding print data.

Figure 5:
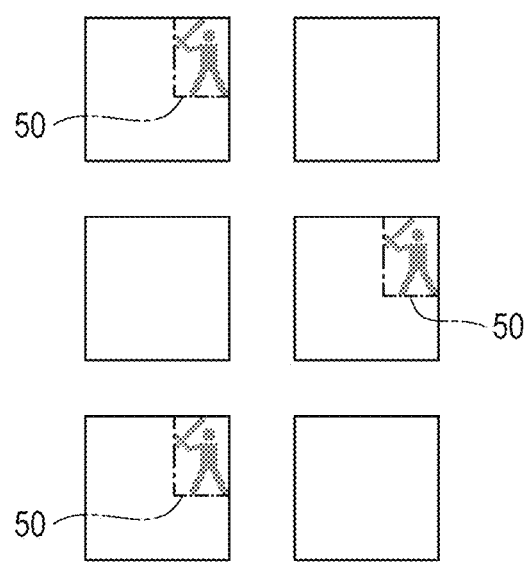
FIG. 5 is a conceptual diagram illustrating specific areas where succeeding images are printed.

FIG. 5 is a conceptual diagram illustrating specific areas 50. The succeeding print data includes information indicating not only the shape and color of each succeeding image but also a printing position of the succeeding image on the post-overprinting medium 22. For example, if the succeeding print data has the contents illustrated in FIG. 4A, the succeeding print data indicates that the succeeding images are printed in areas at the upper right corners of the first, third, and fifth pages of the post-overprinting medium 22 as described above. Thus, the inspection instructor 42 may identify the specific areas 50 at the upper right corners of the first, third, and fifth pages of the post-overprinting medium 22 based on the succeeding print data.

If a plurality of succeeding images are printed away from each other in one page of the post-overprinting medium 22, the specific-area information may indicate a plurality of specific areas in one page. If the post-overprinting medium 22 has a plurality of pages and the succeeding images on the respective pages are printed in different areas, the inspection instructor 42 transmits, to the overprinting inspection apparatus 18, specific-area information in which page numbers of the post-overprinting medium 22 are associated with the specific areas 50 where the succeeding images are printed on the respective pages.

If the inspection instructor 42 transmits the specific-area information to the overprinting inspection apparatus 18 as the inspection information in place of the specific-color information, the succeeding image need not be printed in the specific color.

The overlap determiner 44 and the data combiner 46 are described later.

Figure 6:
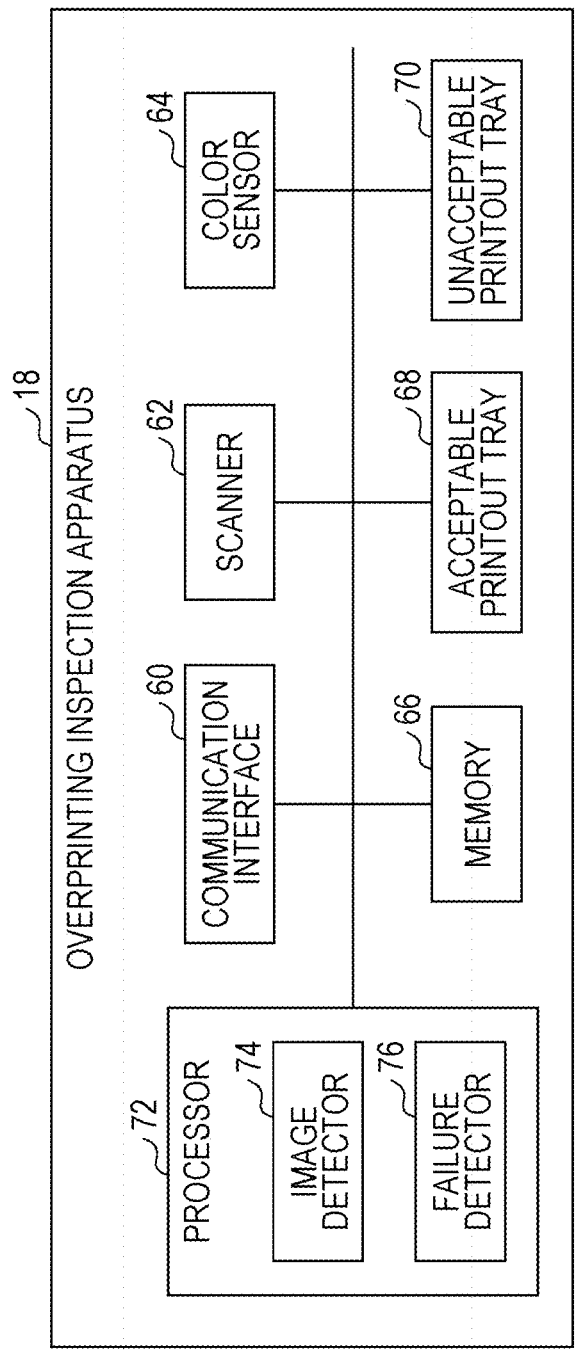
FIG. 6 is a schematic diagram illustrating the configuration of an overprinting inspection apparatus according to the exemplary embodiment.

FIG. 6 is a schematic diagram illustrating the configuration of the overprinting inspection apparatus 18. In this exemplary embodiment, the overprinting inspection apparatus 18 is coupled to the succeeding image forming apparatus 16, but may be provided away from and communicably connected to the succeeding image forming apparatus 16. The overprinting inspection apparatus 18 may be any apparatus as long as the following functions are implemented.

Examples of a communication interface 60 include a network adapter and a dedicated adapter that connects the overprinting inspection apparatus 18 to other apparatuses (in particular, the overprinting inspection apparatus 18 to the succeeding image forming apparatus 16). The communication interface 60 has a function of communicating with other apparatuses. For example, the communication interface 60 receives preceding print data and succeeding print data from the printing control apparatus 12. The communication interface 60 receives the inspection information and the inspection instruction from the printing control apparatus 12. The communication interface 60 transmits a result of overprinting inspection to the printing control apparatus 12.

For example, a scanner 62 includes a light source and a CCD image sensor. The scanner 62 optically reads the post-overprinting medium 22 on which the post-overprinting image has been printed to acquire read image data indicating the post-overprinting image (hereinafter referred to as "post-overprinting image data"). In place of the scanner 62, the overprinting inspection apparatus 18 may have a camera that shoots the post-overprinting medium 22 to acquire the post-overprinting image data from the post-overprinting medium 22.

A color sensor 64 may detect a predetermined color. Examples of the color sensor 64 include a photoelectric sensor. A color to be detected by the photoelectric sensor may be set. Alternatively, a plurality of photoelectric sensors each configured to detect one color may be provided and a set color may be detected by operating only the photoelectric sensor that detects the set color. The photoelectric sensor may directly sense the post-overprinting medium 22. In this case, the scanner 62 need not acquire the post-overprinting image data. The color sensor 64 may be a color identification sensor having a function of detecting colors of pixels in the post-overprinting image data.

Examples of a memory 66 include a ROM and a RAM. The memory 66 may be provided separately from a processor 72 described later, or at least a part of the memory 66 may be provided inside the processor 72. The memory 66 stores an overprinting inspection program for operating individual parts of the overprinting inspection apparatus 18. The memory 66 temporarily retains the post-overprinting image data acquired by the scanner 62.

A post-overprinting medium 22 that has undergone overprinting inspection performed by the processor 72 is output onto an acceptable printout tray 68 or an unacceptable printout tray 70. If the determination result of the overprinting inspection is "good", the post-overprinting medium 22 is output onto the acceptable printout tray 68. If the determination result of the overprinting inspection is "failed", the post-overprinting medium 22 is output onto the unacceptable printout tray 70.

As illustrated in FIG. 6, the processor 72 functions as an image detector 74 and a failure detector 76 based on the overprinting inspection program stored in the memory 66.

The image detector 74 performs processes for detecting a succeeding image from the post-overprinting medium 22 based on inspection information received from the printing control apparatus 12.

Figure 7:
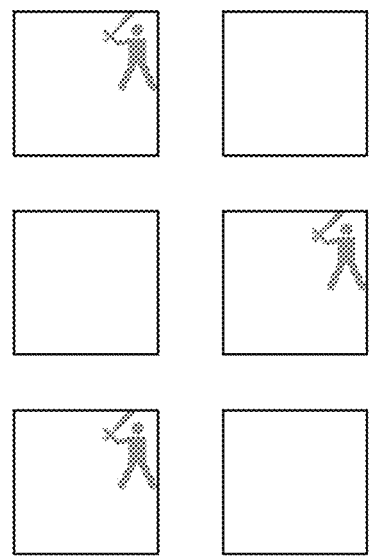
FIG. 7 illustrates succeeding images detected from the post-overprinting medium.

First, description is given about a case where specific-color information is received from the printing control apparatus 12 as the inspection information. As described above, the specific color indicated by the specific-color information is a color of the succeeding image. Therefore, the image detector 74 sets the specific color as a color to be detected by the color sensor 64, and the color sensor 64 detects the specific color from the post-overprinting image data acquired by the scanner 62 or directly from the post-overprinting medium 22. In this manner, the succeeding image may be detected. For example, if the post-overprinting medium 22 is the one illustrated in FIG. 4B, the characters "1" to "6" serving as the preceding images are printed in a color other than the specific color (e.g., black), and the "batter" images serving as the succeeding images are printed in the specific color (e.g., red). Only the succeeding images are detected as illustrated in FIG. 7 by setting the specific color as the color to be detected by the color sensor 64.

If the specific-color information indicates a plurality of colors, that is, if the succeeding image is printed in a plurality of colors, the image detector 74 may detect the succeeding image from the post-overprinting medium 22 by setting the plurality of colors as colors to be detected by the color sensor 64. If the specific-color information is information in which page numbers of the post-overprinting medium 22 are associated with the specific colors, that is, if the post-overprinting medium 22 has a plurality of pages and the succeeding images on the respective pages are printed in different specific colors, the image detector 74 may detect the succeeding images from the respective pages of the post-overprinting medium 22 (or the post-overprinting image data) by varying the specific colors to be detected by the color sensor 64 for the respective pages based on the specific-color information.

If specific-area information is received from the printing control apparatus 12 as the inspection information, the image detector 74 extracts the specific area 50 (see FIG. 5) indicated by the specific-area information from the post-overprinting image data acquired by the scanner 62. In this manner, the succeeding image may be detected. If the specific-area information is information in which page numbers of the post-overprinting medium 22 are associated with the specific areas 50, that is, if the post-overprinting medium 22 has a plurality of pages and the succeeding images on the respective pages are printed in different areas, the image detector 74 may detect the succeeding images from the respective pages of the post-overprinting medium 22 by extracting the different specific areas 50 from the respective pages of the post-overprinting image data based on the specific-area information.

If the specific-color information and the specific-area information are received from the printing control apparatus 12 as the inspection information, the image detector 74 detects the succeeding image by causing the color sensor 64 to detect the specific color from the specific area 50 in the post-overprinting medium 22 or the post-overprinting image data.

Through the processes performed by the image detector 74, the succeeding image is detected from the post-overprinting medium 22 as illustrated in FIG. 7. Comparing FIG. 4A and FIG. 7, the succeeding print data has a match with the succeeding image detected from the post-overprinting medium 22 as long as the succeeding image forming apparatus 16 properly performs the overprinting.

The failure detector 76 detects failure in the overprinting performed by the succeeding image forming apparatus 16 by comparing the succeeding print data and the succeeding image detected by the image detector 74. The succeeding print data may be acquired from the printing control apparatus 12 or the succeeding image forming apparatus 16. The failure detector 76 rasterizes the acquired succeeding print data and compares the rasterized succeeding print data and the detected succeeding image. Alternatively, the failure detector 76 may acquire the rasterized succeeding print data from the succeeding image forming apparatus 16.

Any known method may be employed as a specific method for comparing the succeeding image and the succeeding print data. For example, pattern matching may be performed between the succeeding image and the succeeding print data to detect a difference therebetween. Alternatively, features (e.g., edges) may be detected from the succeeding image and the succeeding print data and comparison may be made between the detected features. Still alternatively, comparison may be made between pixel values (e.g., brightness values or color values) of pixels in the succeeding image and pixel values of corresponding pixels in the succeeding print data.

As described above, the succeeding print data is expected to have a match with the succeeding image detected from the post-overprinting medium 22 as long as the succeeding image forming apparatus 16 properly performs the overprinting. The failure detector 76 may determine that the overprinting related to the post-overprinting medium 22 is "good" if the similarity between the detected succeeding image and the succeeding print data is equal to or higher than a predetermined threshold. The failure detector 76 may determine that the overprinting related to the post-overprinting medium 22 is "failed" if the similarity between the detected succeeding image and the succeeding print data is lower than the predetermined threshold.

If the post-overprinting medium 22 has a plurality of pages, the failure detector 76 compares the succeeding print data and the succeeding image detected by the image detector 74 on a page-by-page basis. Specifically, the failure detector 76 compares a succeeding image detected from a certain page of the post-overprinting medium 22 and succeeding print data corresponding to this page.

If the failure detector 76 determines that the overprinting is "good", the post-overprinting medium 22 (or a page of the post-overprinting medium 22) is output onto the acceptable printout tray 68. If the failure detector 76 determines that the overprinting is "failed", the post-overprinting medium 22 (or a page of the post-overprinting medium 22) is output onto the unacceptable printout tray 70.

The failure detector 76 transmits information indicating a result of the overprinting inspection to the printing control apparatus 12. The processor 38 of the printing control apparatus 12 notifies the user of the inspection result by, for example, displaying the inspection result on the display 34.

The overlap determiner 44 and the data combiner 46 of the printing control apparatus 12 (see FIG. 2) are described below.

When overprinting is performed by using preceding print data and succeeding print data, the overlap determiner 44 determines whether a preceding image and a succeeding image overlap each other on the post-overprinting medium 22 based on the preceding print data and the succeeding print data. In other words, the overlap determiner 44 determines whether the succeeding image is laid over the preceding image through the overprinting. The preceding print data includes information indicating the shape and printing position of the preceding image on the pre-overprinting medium 20. The succeeding print data includes information indicating the shape and printing position of the succeeding image on the post-overprinting medium 22.

Figure 8:
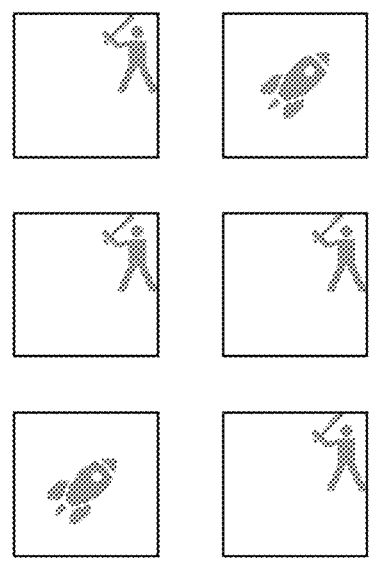
FIG. 8 illustrates another example of the succeeding print data.

If the post-overprinting medium 22 has a plurality of pages, the overlap determiner 44 determines whether the preceding image and the succeeding image overlap each other on a page-by-page basis. For example, if the preceding print data and the pre-overprinting medium 20 are the ones illustrated in FIG. 3A and FIG. 3B, respectively, and the succeeding print data is the one illustrated in FIG. 8, the post-overprinting medium 22 is the one illustrated in FIG. 9. In this case, the overlap determiner 44 determines that the preceding image and the succeeding image do not overlap each other on the first, second, fifth, and sixth pages of the post-overprinting medium 22, but the preceding image and the succeeding image overlap each other on the third and fourth pages of the post-overprinting medium 22.

If the overlap determiner 44 determines that the preceding image and the succeeding image overlap each other on the post-overprinting medium 22, the data combiner 46 generates combined data by combining the preceding print data and the succeeding print data. Combining the preceding print data and the succeeding print data means that the combined data indicates a post-overprinting image obtained by overlaying the preceding image indicated by the preceding print data with the succeeding image indicated by the succeeding print data while their positions are aligned. If the post-overprinting medium 22 has a plurality of pages, the data combiner 46 may generate combined data of only a page where the preceding image and the succeeding image overlap each other, and need not generate combined data of a page where the preceding image and the succeeding image do not overlap each other. For example, if the post-overprinting medium 22 is the one illustrated in FIG. 9, the data combiner 46 does not generate combined data of the first, second, fifth, and sixth pages of the post-overprinting medium 22, but generates combined data of the third page by combining the third page of the preceding print data and the third page of the succeeding print data, and generates combined data of the fourth page by combining the fourth page of the preceding print data and the fourth page of the succeeding print data.

The data combiner 46 transmits the generated combined data to the overprinting inspection apparatus 18 as the inspection information. If the post-overprinting medium 22 has a plurality of pages, the data combiner 46 transmits, to the overprinting inspection apparatus 18, page numbers of the post-overprinting medium 22 and pieces of combined data of the respective pages in association with each other. In this case, the inspection information on the pages where the preceding image and the succeeding image do not overlap each other (first, second, fifth, and sixth pages in FIG. 9) is at least one of the specific-color information or the specific-area information, and the inspection information on the pages where the preceding image and the succeeding image overlap each other (third and fourth pages in FIG. 9) is the combined data.

If the preceding image and the succeeding image do not overlap each other on the post-overprinting medium 22, the failure detector 76 of the overprinting inspection apparatus 18 detects overprinting failure by comparing the succeeding print data and the succeeding image detected by the image detector 74 as described above. If the preceding image and the succeeding image overlap each other on the post-overprinting medium 22, the failure detector 76 detects overprinting failure by comparing the preceding print data, the succeeding print data, and the post-overprinting image. In this exemplary embodiment, the failure detector 76 detects overprinting failure by comparing the combined data received from the printing control apparatus 12 and the post-overprinting image data acquired by the scanner 62 optically reading the post-overprinting medium 22.

A method similar to the method for comparing the succeeding image and the succeeding print data may be employed as a method for comparing the combined data and the post-overprinting image data.

The failure detector 76 may determine that the overprinting related to the post-overprinting medium 22 is "good" if the similarity between the combined data and the post-overprinting image data is equal to or higher than a predetermined threshold. The failure detector 76 may determine that the overprinting related to the post-overprinting medium 22 is "failed" if the similarity between the combined data and the post-overprinting image data is lower than the predetermined threshold.

Regarding the inspection information received from the printing control apparatus 12, it is assumed that inspection information on a subset of a plurality of pages of the post-overprinting medium 22 is specific-color information or specific-area information and inspection information on the other pages is combined data. That is, it is assumed that the post-overprinting medium 22 has a plurality of pages and a preceding image and a succeeding image overlap each other only on a subset of the plurality of pages. On a page where the preceding image and the succeeding image do not overlap each other, the failure detector 76 detects overprinting failure by comparing the succeeding print data and the succeeding image detected by the image detector 74 based on the specific-color information or the specific-area information serving as the inspection information. On a page where the preceding image and the succeeding image overlap each other, the failure detector 76 detects overprinting failure by comparing the combined data serving as the inspection information and the post-overprinting image data acquired by the scanner 62.

Figure 9:
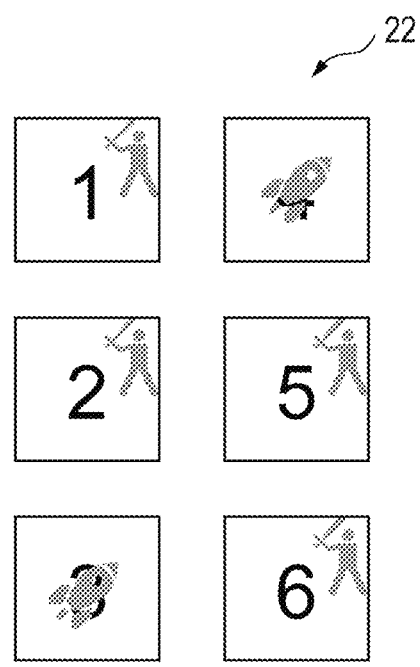
FIG. 9 illustrates another example of the post-overprinting medium.

For example, if the post-overprinting medium 22 is the one illustrated in FIG. 9, the failure detector 76 detects overprinting failure on the first, second, fifth, and sixth pages by comparing the succeeding print data and the succeeding image detected by the image detector 74 because the preceding image and the succeeding image do not overlap each other, and detects overprinting failure on the third and fourth pages by comparing the combined data and the post-overprinting image data because the preceding image and the succeeding image overlap each other.

In this exemplary embodiment, the method for comparing the preceding print data, the succeeding print data, and the post-overprinting image is the comparison between the post-overprinting image data and the combined data generated by using the preceding print data and the succeeding print data by the data combiner 46 of the printing control apparatus 12. The comparison method is not limited to this method. For example, the failure detector 76 may acquire the preceding print data and the succeeding print data from the printing control apparatus 12, and compare the succeeding print data and differential image data obtained by subtracting the preceding print data from the post-overprinting image data, or compare the preceding print data and differential image data obtained by subtracting the succeeding print data from the post-overprinting image data.

As described above, the image detector 74 of the overprinting inspection apparatus 18 detects the succeeding image by detecting the specific color from the post-overprinting image data or the post-overprinting medium 22. If the preceding image and the succeeding image overlap each other on the post-overprinting medium 22, however, the color of the overlapping portion is not always the selected specific color with which the succeeding image is overprinted. Thus, if the preceding image and the succeeding image overlap each other on the post-overprinting medium 22, the image detector 74 may fail to appropriately detect the succeeding image by detecting the specific color from the post-overprinting medium 22.

Also in the case where the image detector 74 detects the succeeding image by extracting the specific area 50 from the post-overprinting image data (see FIG. 5), the specific area 50 includes at least a part of the preceding image as well as the succeeding image when the preceding image and the succeeding image overlap each other on the post-overprinting medium 22. Thus, if the preceding image and the succeeding image overlap each other on the post-overprinting medium 22, the image detector 74 may fail to appropriately detect the succeeding image by extracting the specific area 50 from the post-overprinting image data.

In this exemplary embodiment, if the preceding image and the succeeding image overlap each other on the post-overprinting medium 22, overprinting failure is detected by comparing the preceding print data, the succeeding print data, and the post-overprinting image.

Figure 10:
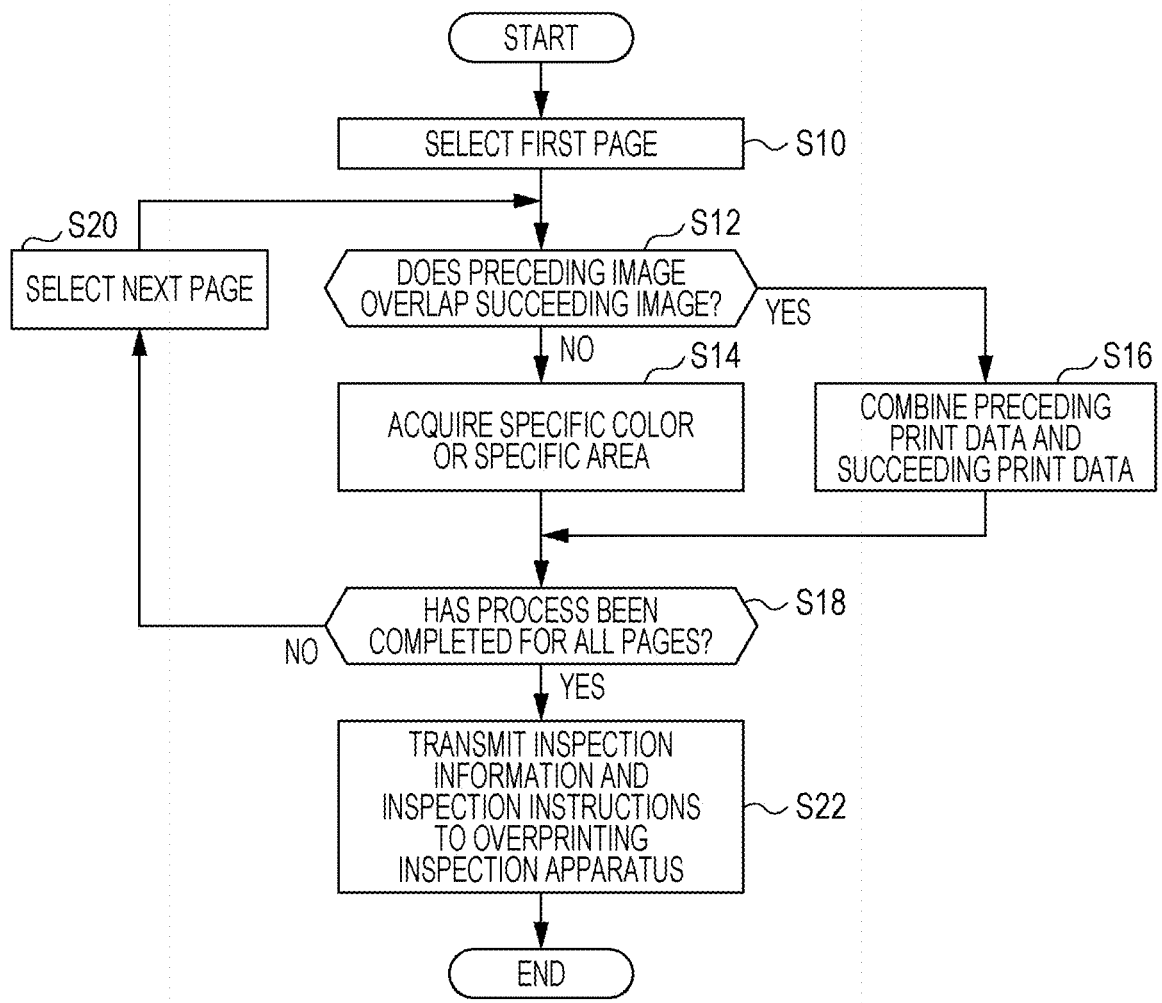
FIG. 10 is a flowchart illustrating a flow of a process to be performed by the printing control apparatus according to the exemplary embodiment.

A flow of a process to be performed by the printing control apparatus 12 according to this exemplary embodiment is described below with reference to the flowchart of FIG. 10. Preceding print data and succeeding print data in this flowchart indicate preceding images and succeeding images on a plurality of pages, respectively.

In Step S10, the processor 38 of the printing control apparatus 12 selects a first page from among the plurality of pages indicated by the preceding print data and the succeeding print data.

In Step S12, the overlap determiner 44 determines whether the preceding image and the succeeding image overlap each other on the selected page based on the preceding print data and the succeeding print data.

If the preceding image and the succeeding image do not overlap each other, the process proceeds to Step S14. In Step S14, the inspection instructor 42 acquires specific-color information indicating a specific color used for printing the succeeding image as inspection information based on the succeeding print data. In place of or in addition to the specific-color information, the inspection instructor 42 may acquire specific-area information indicating a specific area where the succeeding image is printed as the inspection information based on the succeeding print data. The inspection instructor 42 retains the acquired inspection information (at least one of the specific-color information or the specific-area information) and the page number in association with each other.

If the preceding image and the succeeding image overlap each other, the process proceeds to Step S16. In Step S16, the data combiner 46 combines preceding print data and succeeding print data of the selected page to acquire combined data of the page as the inspection information. The inspection instructor 42 retains the acquired inspection information (combined data) and the page number in association with each other.

In Step S18, the processor 38 determines whether the process for acquiring the inspection information has been completed for all the pages.

If the process has not been completed for all the pages, the process proceeds to Step S20. In Step S20, the processor 38 selects a next page. Then, the processor 38 performs the processes of Steps S12 to S16 for the next page.

If the process has been completed for all the pages, the process proceeds to Step S22. In Step S22, the inspection instructor 42 transmits, to the overprinting inspection apparatus 18, the pieces of inspection information and overprinting inspection instructions that are associated with the respective pages.

Figure 11:
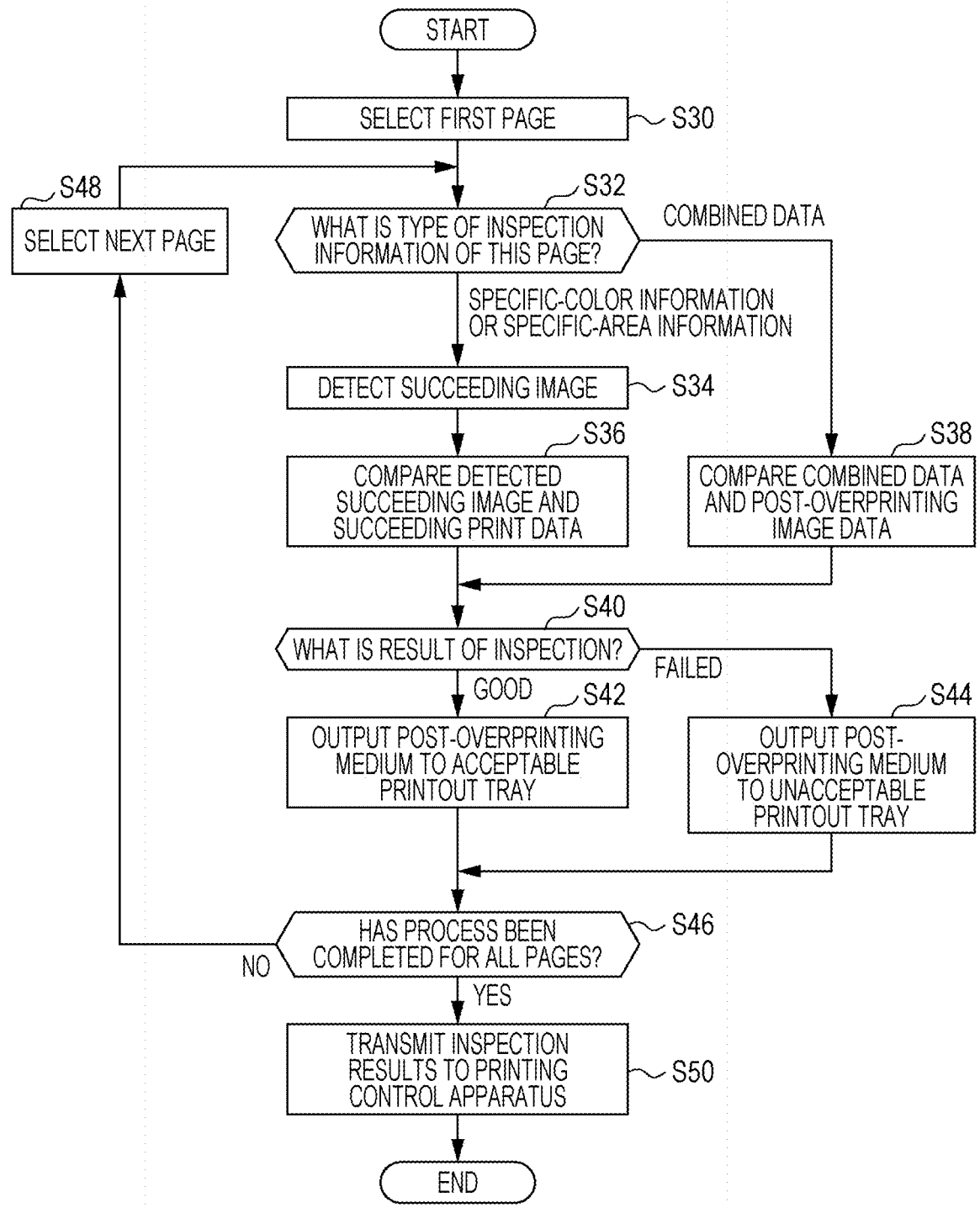
FIG. 11 is a flowchart illustrating a flow of a process to be performed by the overprinting inspection apparatus according to the exemplary embodiment.
Figure 12:
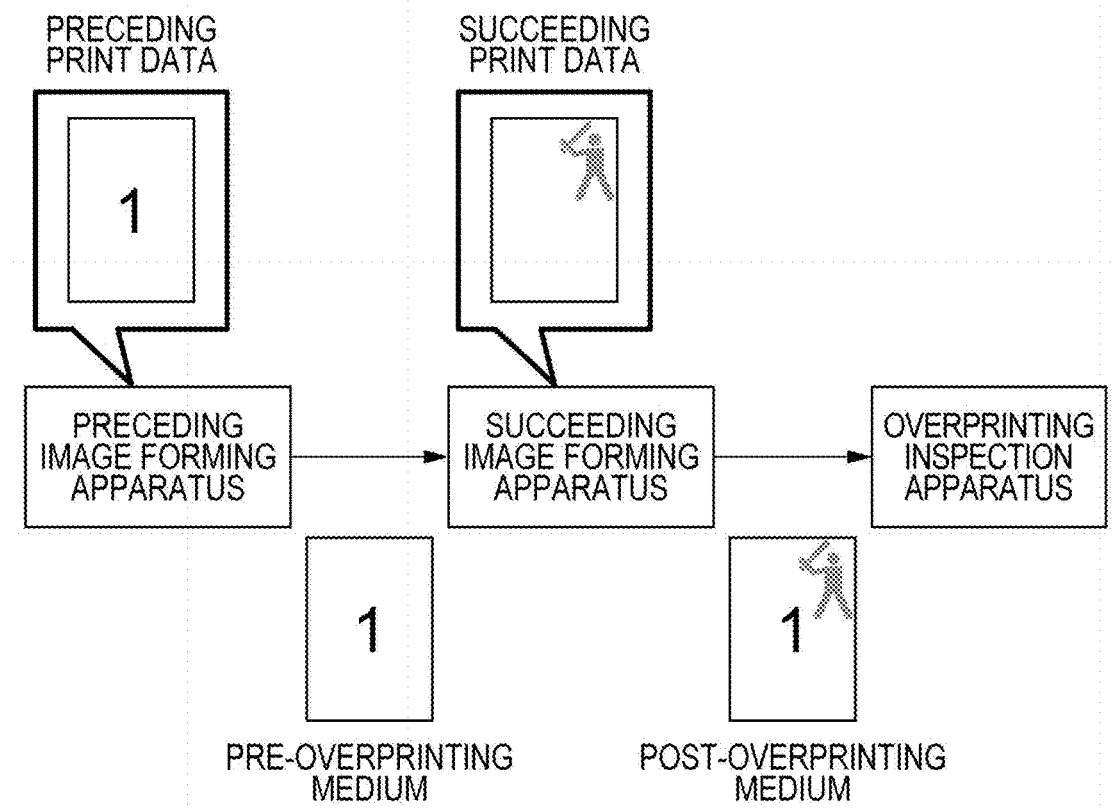
FIG. 12 illustrates related-art overprinting.

A flow of a process to be performed by the overprinting inspection apparatus 18 according to this exemplary embodiment is described below with reference to the flowchart of FIG. 11.

In Step S30, the processor 72 of the overprinting inspection apparatus 18 selects a first page of a post-overprinting medium 22 to be inspected.

In Step S32, the failure detector 76 determines the type of inspection information of the selected page that has been received from the printing control apparatus 12.

If the inspection information of the page is specific-color information or specific-area information, the process proceeds to Step S34. In Step S34, the image detector 74 detects a succeeding image from post-overprinting image data acquired by the scanner 62 or directly from the post-overprinting medium 22 based on the inspection information.

In Step S36, the failure detector 76 compares the succeeding image detected in Step S34 and succeeding print data received from the printing control apparatus 12.

If the inspection information of the page is combined data, the process proceeds to Step S38. In Step S38, the failure detector 76 compares the combined data and post-overprinting image data acquired by the scanner 62.

In Step S40, the failure detector 76 makes determination about an overprinting inspection result on the selected page. Specifically, the failure detector 76 determines "good" as the overprinting inspection result if the similarity between the succeeding image and the succeeding print data or the similarity between the combined data and the post-overprinting image data is equal to or higher than the predetermined threshold. The failure detector 76 determines "failed" as the overprinting inspection result if the similarity between the succeeding image and the succeeding print data or the similarity between the combined data and the post-overprinting image data is lower than the predetermined threshold.

If the inspection result is "good", the process proceeds to Step S42. In Step S42, the processor 72 outputs the selected page of the post-overprinting medium 22 onto the acceptable printout tray 68.

If the inspection result is "failed", the process proceeds to Step S44. In Step S44, the processor 72 outputs the selected page of the post-overprinting medium 22 onto the unacceptable printout tray 70.

In Step S46, the processor 72 determines whether the overprinting inspection process has been completed for all the pages.

If the inspection process has not been completed for all the pages, the process proceeds to Step S48. In Step S48, the processor 72 selects a next page. Then, the processor 72 performs the processes of Steps S32 to S44 for the next page.

If the inspection process has been completed for all the pages, the process proceeds to Step S50. In Step S50, the failure detector 76 transmits the overprinting inspection results on the respective pages to the printing control apparatus 12.

In this exemplary embodiment, the printing control apparatus 12 controls the overprinting inspection but the overprinting inspection apparatus 18 may perform the processes related to the overprinting inspection. That is, the overprinting inspection apparatus 18 may have the functions of the inspection instructor 42, the overlap determiner 44, and the data combiner 46 of the printing control apparatus 12. In this case, the overprinting inspection apparatus 18 performs the processes while receiving preceding print data from the printing control apparatus 12 or the preceding image forming apparatus 14 and succeeding print data from the printing control apparatus 12 or the succeeding image forming apparatus 16 as appropriate.

If the overprinting inspection apparatus 18 has the functions described above, the overprinting inspection apparatus 18 may fail to acquire the preceding print data from the printing control apparatus 12 or the preceding image forming apparatus 14. In this case, the processor 72 of the overprinting inspection apparatus 18 may use, as the preceding print data, image data obtained by optically reading the pre-overprinting medium 20. The pre-overprinting medium 20 may be read by the scanner 62 of the overprinting inspection apparatus 18. Alternatively, the pre-overprinting medium 20 may be read by another optical reader provided between the preceding image forming apparatus 14 and the succeeding image forming apparatus 16 and the overprinting inspection apparatus 18 may acquire the image data from the optical reader.

In this exemplary embodiment, the scanner 62, the color sensor 64, and the image detector 74 are provided in the overprinting inspection apparatus 18 but may be provided in a different apparatus. For example, those components may be provided in the succeeding image forming apparatus 16.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An overprinting inspection apparatus comprising
a processor configured to detect failure in overprinting by comparing succeeding print data and a succeeding image detected from a post-overprinting medium obtained by the overprinting, the overprinting being printing of the succeeding image based on the succeeding print data over a pre-overprinting medium on which a preceding image has been printed based on preceding print data, wherein the succeeding image is detected from the post-overprinting medium by detecting at least one of a specific color where the succeeding image is printed on the post-overprinting medium and a specific area where the succeeding image is printed on the post-overprinting medium.

2. The overprinting inspection apparatus according to claim 1,
wherein the succeeding image is overprinted in the specific color that is not used for the preceding image, and
wherein the succeeding image is detected from the post-overprinting medium by a sensor that detects the specific color.

3. The overprinting inspection apparatus according to claim 2, wherein the specific area being identified based on the succeeding print data.

4. The overprinting inspection apparatus according to claim 3, wherein the processor is configured to, if the preceding image and the succeeding image overlap each other on the post-overprinting medium, detect the failure in the overprinting by comparing the preceding print data, the succeeding print data, and an image printed on the post-overprinting medium.

5. The overprinting inspection apparatus according to claim 4, wherein the preceding print data is image data acquired by optically reading the pre-overprinting medium.

6. The overprinting inspection apparatus according to claim 4,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

7. The overprinting inspection apparatus according to claim 2, wherein the processor is configured to, if the preceding image and the succeeding image overlap each other on the post-overprinting medium, detect the failure in the overprinting by comparing the preceding print data, the succeeding print data, and an image printed on the post-overprinting medium.

8. The overprinting inspection apparatus according to claim 7, wherein the preceding print data is image data acquired by optically reading the pre-overprinting medium.

9. The overprinting inspection apparatus according to claim 8,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

10. The overprinting inspection apparatus according to claim 7,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

11. The overprinting inspection apparatus according to claim 1, wherein the specific area being identified based on the succeeding print data.

12. The overprinting inspection apparatus according to claim 11, wherein the processor is configured to, if the preceding image and the succeeding image overlap each other on the post-overprinting medium, detect the failure in the overprinting by comparing the preceding print data, the succeeding print data, and an image printed on the post-overprinting medium.

13. The overprinting inspection apparatus according to claim 12, wherein the preceding print data is image data acquired by optically reading the pre-overprinting medium.

14. The overprinting inspection apparatus according to claim 13,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

15. The overprinting inspection apparatus according to claim 12,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

16. The overprinting inspection apparatus according to claim 1, wherein the processor is configured to, if the preceding image and the succeeding image overlap each other on the post-overprinting medium, detect the failure in the overprinting by comparing the preceding print data, the succeeding print data, and an image printed on the post-overprinting medium.

17. The overprinting inspection apparatus according to claim 16, wherein the preceding print data is image data acquired by optically reading the pre-overprinting medium.

18. The overprinting inspection apparatus according to claim 17,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and
on a page where the preceding image and the succeeding image overlap each other, detect the failure in the overprinting by comparing the preceding image, the succeeding image, and the image printed on the post-overprinting medium.

19. The overprinting inspection apparatus according to claim 16,
wherein a post-overprinting medium having a plurality of pages is obtained by performing the overprinting based on succeeding print data of a plurality of pages on a pre-overprinting medium having a plurality of pages, and
wherein the processor is configured to
on a page where the preceding image and the succeeding image do not overlap each other, detect the failure in the overprinting by comparing the succeeding print data and the succeeding image detected from the page, and on a page where the preceding image and the succeeding image overlap each other, detect the failure in the overprinting by comparing the preceding image, the succeeding image, and the image printed on the post-overprinting medium.

20. A non-transitory computer readable medium storing an overprinting inspection program causing a computer to execute a process comprising detecting failure in overprinting by comparing succeeding print data and a succeeding image detected from a post-overprinting medium obtained by the overprinting, the overprinting being printing of the succeeding image based on the succeeding print data over a pre-overprinting medium on which a preceding image has been printed based on preceding print data, wherein the succeeding image is detected from the post-overprinting medium by detecting at least one of a specific color where the succeeding image is printed on the post-overprinting medium and a specific area where the succeeding image is printed on the post-overprinting medium.

* * * * *